United States Patent [19]

Thomson et al.

[11] Patent Number: 4,702,405
[45] Date of Patent: Oct. 27, 1987

[54] FRICTION WELDING APPARATUS

[75] Inventors: Allan R. Thomson; Thomas V. Heath, both of Rosshire, Scotland

[73] Assignee: Thomson Welding & Inspection Ltd., Rosshire, Scotland

[21] Appl. No.: 2,715

[22] PCT Filed: May 7, 1986

[86] PCT No.: PCT/GB86/00241
§ 371 Date: Dec. 30, 1986
§ 102(e) Date: Dec. 30, 1986

[87] PCT Pub. No.: WO86/06664
PCT Pub. Date: Nov. 20, 1986

[30] Foreign Application Priority Data

May 10, 1985 [GB] United Kingdom ............... 8511856
Jun. 4, 1985 [GB] United Kingdom ............... 8514115
Jun. 10, 1985 [GB] United Kingdom ............... 8514609
Jun. 17, 1985 [GB] United Kingdom ............... 8515271

[51] Int. Cl.⁴ ...................... B23K 20/12; B23K 27/00
[52] U.S. Cl. ...................... 228/2; 228/44.3; 228/113
[58] Field of Search ............... 228/2, 44.3, 112–114

[56] References Cited

U.S. PATENT DOCUMENTS 3,616,980  11/1971  Padilla ............................ 228/2
3,704,821  12/1972  Loyd et al. ...................... 228/2
3,882,593   5/1975  Lucas .............................. 228/113
4,213,554   7/1980  Sciaky ............................. 228/2
4,593,848   6/1986  Hochbein ......................... 228/2

FOREIGN PATENT DOCUMENTS

1293141  10/1972  United Kingdom ............... 228/112
1297847  11/1972  United Kingdom ............... 228/112

Primary Examiner—Nicholas P. Godici
Assistant Examiner—Samuel M. Heinrich
Attorney, Agent, or Firm—Hoffmann, Dilworth, Barrese & Baron

[57] ABSTRACT

Friction welding apparatus comprises a housing (1, 2) and a workpiece support (20', 24) rotatably and axially movably mounted in the housing. An air driven motor (20) is coupled to the workpiece support (20', 24) to cause the workpiece support to rotate relatively to the housing. A compression spring (33) urges the workpiece support in a first axial direction relatively to the housing while a piston (7) responsive to air pressure is provided to move the workpiece support (20', 24) relatively to the housing (1, 2) in a second axial direction opposite to the first direction. Air under pressure is communicated through a common inlet (6) in the housing (1, 2) to a valve arrangement (8, 9, 13, 14) so that air is conveyed along a first path to the drive motor (20) and along a second path to the piston (7). The valve arrangement is such that axial movement of the piston (7) relatively to the housing (1, 2) causes the valve gradually to close thereby gradually stopping rotation of the motor (20). The second path remains open.

8 Claims, 8 Drawing Figures

FRICTION WELDING APPARATUS

The invention relates to friction welding apparatus.

In conventional friction welding, relative rotation between a pair of workpieces is caused while the work pieces are urged together. Typically thereafter once sufficient heat is built up at the interface between the workpieces, relative rotation is stopped and the workpieces are urged together under forging force which may be the same as or greater than the original urging force.

Conventional friction welding apparatus typically includes complex electronic controls for controlling the different forces which must be applied and for controlling drive means in a selective manner to control relative rotation of the workpieces.

In accordance with the present invention, friction welding apparatus comprises a housing; a workpiece support rotatably and axially movably mounted in the housing; a fluid pressure operated drive coupled to the workpiece support for causing the workpiece support to rotate relatively to the housing; resilient means for urging the workpiece support in a first axial direction relatively to the housing; pressure means responsive to fluid pressure to move the a workpiece support relative to the housing in a second axial direction opposite to the first direction; a fluid inlet in the housing; fluid conveying means for communicating fluid under pressure from the inlet along a first path to the drive and along a second path to the pressure means; and control means responsive to axial movement of the workpiece support in the housing for controlling the fluid pressure communicated along the first path whereby as the workpiece support moves in the housing under the influence of the pressure means, the first path is gradually closed while the second path remains open.

The invention simplifies the known friction welding apparatus by providing a common inlet for fluid under pressure which is then used initially to operate a drive and to urge the workpiece support in the second direction. Subsequently, the first path will be closed so that the drive will cease to operate and the fluid pressure will be fully applied through the second path to the pressure means. Thus, the friction welding apparatus automatically changes from a first condition in which the drive rotates the workpiece support and the support is urged in the second direction (usually under a comparatively light force) to a second condition in which rotation has stopped and the workpiece support is urged in the second direction under forging force. No operator intervention during the weld cycle is required.

The invention enables portable friction welding apparatus to be developed which is simple to operate in a construction site environment without electric or electronic controls.

The control means could include one or more electronic transducers for axial monitoring movement of the workpiece support and for generating suitable control signals to control the motor and fluid supply.

Preferably, the control means comprises a valve body with an input port communicating with the fluid inlet, output ports communicating with the first and second fluid paths respectively, and a valve member movable in the valve body in response to relative axial movement between the workpiece support and the housing to control fluid communication between the input port and the output port connected to the first path while maintaining the connection between the input port and the other output port. With this arrangement, no electronic controls are required and the apparatus operates simply under the influence of the fluid pressure.

For example, the valve body may comprise a valve seat cooperating with the valve member, one of the valve member and valve seat being connected to the housing and the other being connected to the workpiece support.

It is convenient for the drive to be axially fixed relatively to the workpiece support. In this case, axial movement of the worpiece support relative to the housing will be accompanied by axial movement of the drive.

In some examples, however, the workpiece support could be axially movable relatively to the drive which is itself axially fixed relatively to the housing. This could be achieved, for example, by means of a splined connection between the drive and the workpiece support. The advantage of this latter arrangement is that a substantial portion of the axial forces which would be exerted on the drive are removed and this enables conventional air motors for example to be used.

The pressure means may comprise a piston associated with the workpiece support, possibly via the drive, the piston cooperating with a part of the housing to define a piston/cylinder arrangement.

Conveniently, the piston has a central aperture defining part of the first path. This arrangement allows a very compact construction of the piston/cylinder assembly to be achieved.

The resilient means conveniently comprises a compression spring although other forms of resilient means could be used.

Preferably, the drive comprises an air drive motor. However, other fluid operated drives such as hydraulic motors could also be used.

Although, initially, fluid pressure could be applied at the same time to both the drive and the pressure means when welding for example small diameter studs, preferably the apparatus further comprises timing means positioned in the second fluid path so as to provide an initial time delay before fluid pressure is applied to the pressure means.

An example of friction welding apparatus in accordance with the present invention will now be described with reference to the accompanying drawings, in which.

The portable welding tool shown in the drawings has an outer metal casing having an upper portion 1 secured to a lower portion 2 by bolts (not shown). The tool has a generally circular cross-section centred on an axis 3 and the part 2 of the casing extends in stepwise form towards the axis 3 along the length of the tool. A handle 4 is mounted to the top of the top casing part 1 and a second handle 5 extends from a side of the tool. The handle 5 is hollow and can be attached by a threaded spigot 5' to a source of compressed air. The compressed air can pass into the tool through an opening 6 in the casing pat 1.

Figure 3:
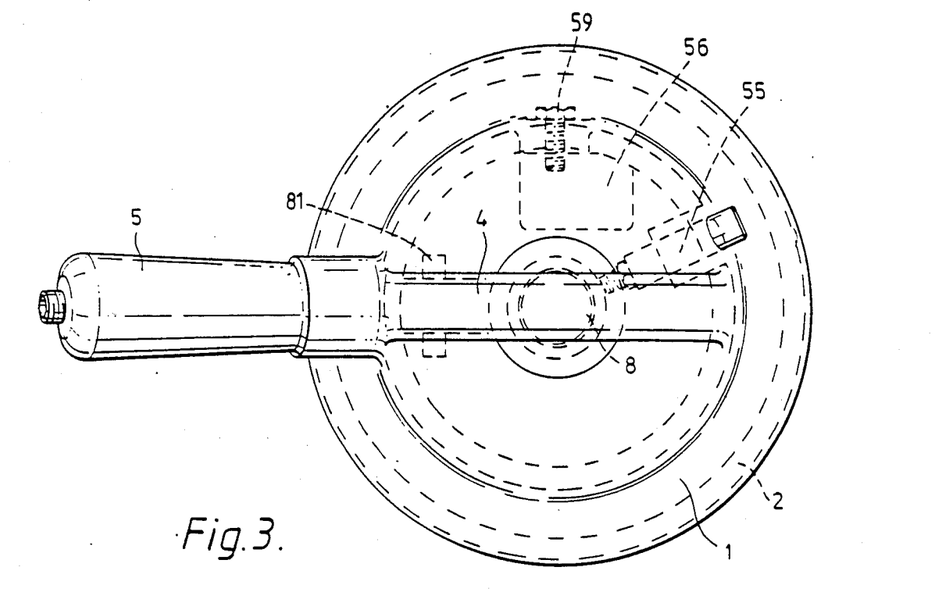
FIG. 3 is a plan of the tool shown in FIGS. 1 and 2 with some parts shown in phantom.

The upper part of the tool defines a piston/cylinder arrangement. The piston comprises a disc shaped element 7 coaxial with the axis 3 of the tool and having an axially extending spigot portion 8 which is also coaxial with the axis 3. The piston is non-rotatably mounted in the tool casing by a retaining yoke 81 (FIG. 3). The portion 8 has axially spaced bores 9, 10 together defining a valve body and joined by a frusto-conical portion 11 defining a valve seat. The portion 8 is sealed to a radially extending web 12 of the casing part 1 by an O-ring 13. The piston 7 is free to move in the axial direction, but is non-rotatable, relative to the casing 1, 2.

A valve member 14 having a frusto-conical form similar to that of the portion 11 is positioned within the bore 9 of the portion 8 on an axially extending finger 15 removably mounted to the casing part 1.

The piston 7 is bolted to a motor casing 16 having an inner cylindrical part 17 including a radially inwardly extending, annular lip 18. The piston 7 engages, via the part 17, a back plate 19 of a vane air motor 20. The motor 20 may be based on any conventional vane air motor and may deliver 4 kW at speeds up to 12000 rpm.

The air motor 20 includes a rotor 21 rotatably supported in a double row angular contact bearing 22 and a needle roller bearing 23. The rotor 21 includes an integral, axially extending part 24 having a blind bore 25. The end 26 of the part 24 is externally screw threaded to enable a chuck 27 to be mounted to it.

The motor 20 also has a speed governer 28.

Axial loads are transmitted through the rotor 21 to the bearing 22 and thence through the motor back plate 19 and the motor casing 16 to the piston 7.

A flywheel 29 is bolted to a disc-shaped support 30 secured to a rotatable drive shaft 20' of the motor 20. In another arrangement (not shown) the flywheel support could be splined to the motor 20 to allow relative axial movement between them. The flywheel support 30 has three openings, one of which 31 is illustrated in the drawings, circumferentially spaced around the axis 3.

The motor casing 16 is sealed within the casing portion 2 by an O-shaped ring seal 32.

Figure 1:
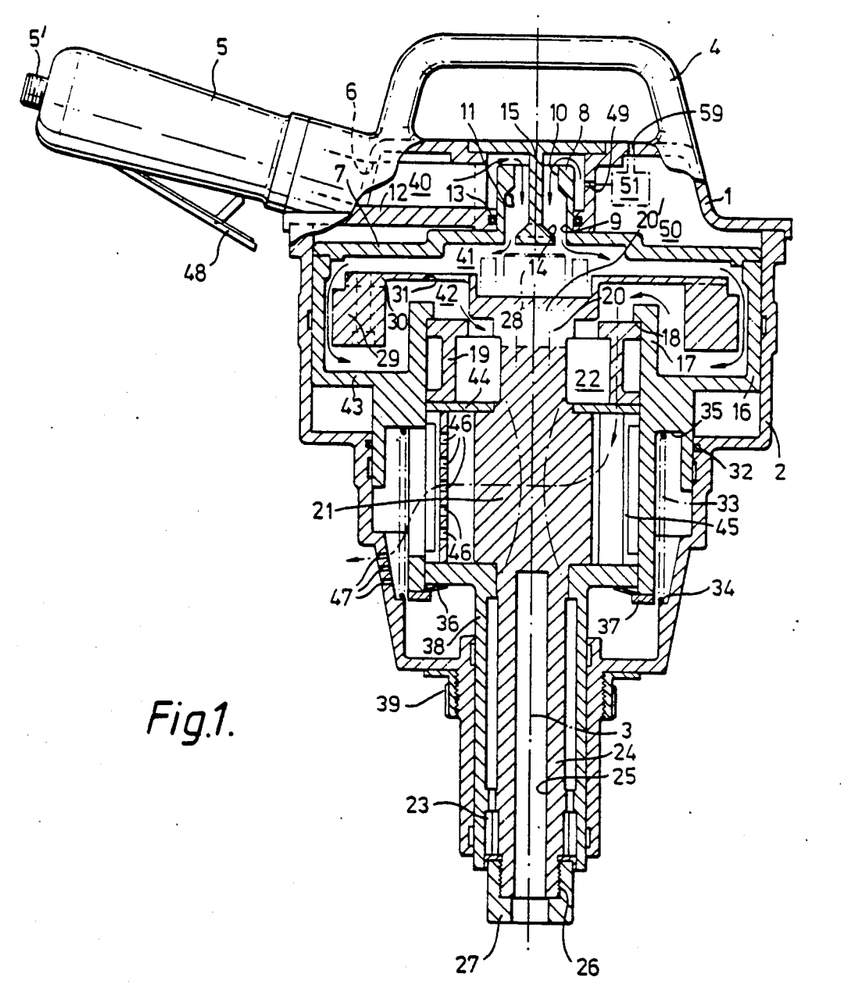
FIG. 1 is a longitudinal, partial cross-section through the portable welding tool in its retracted position.

The motor casing 16 is urged upwardly, as seen in FIG. 1, by a compression spring 33 acting between an inner step 34 of the casing portion 2 and a radially outwardly extending flange 35 integral with the inner cylindrical portion 17.

The rotor itself is able to slide axially through a small distance relatively to the inner portion 17 of the motor casing 16. It is urged to the position shown in FIG. 1 by a circular leaf spring 36 acting between a flange 37 of the cylindrical portion 17 and an outwardly extending flange of a portion 38 of the motor 20.

Figure 7:
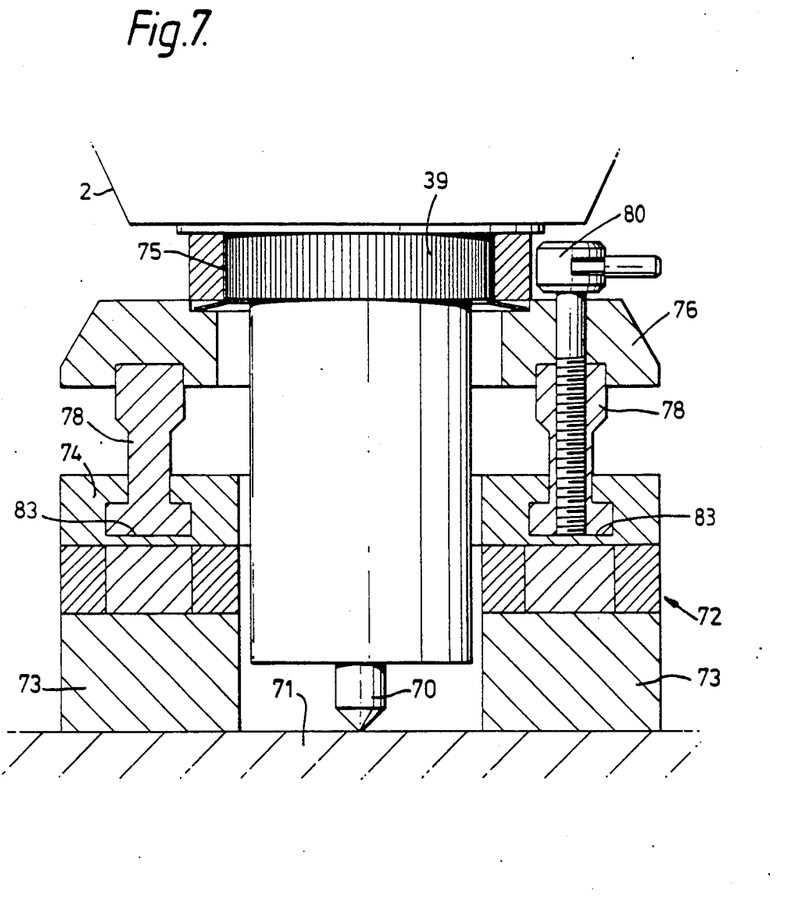
FIG. 7 is a part longitudinal section (taken on line 7—7 FIG. 8) through an arrangement for clamping the tool to a workpiece; and, FIG. 8 is a plan of the clamping arrangement with the tool omitted.

The tool operates as follows. A stud 70 (FIG. 7) is fitted into the chuck 27 which has a suitable drive configuration. For example, the chuck could have a hexagonal or bilobal form. The body of the stud passes through the chuck 27 and is housed in the blind bore 25 within the portion 24. Packing sleeves (not shown) may be fitted within the bore 5 to accommodate studs of different lengths. Alternative chucks may be screwed onto the portion 24 of the rotor 21 to accommodate different drives.

The tool is held against the surface of a carbon steel plate workpiece 71 to which the stud is to be welded by a magnetic clamp 72 into which the tool is fixed via a bayonet connector 39. In other arrangements, pipe, beam and vacuum clamps could be used.

Figure 8:
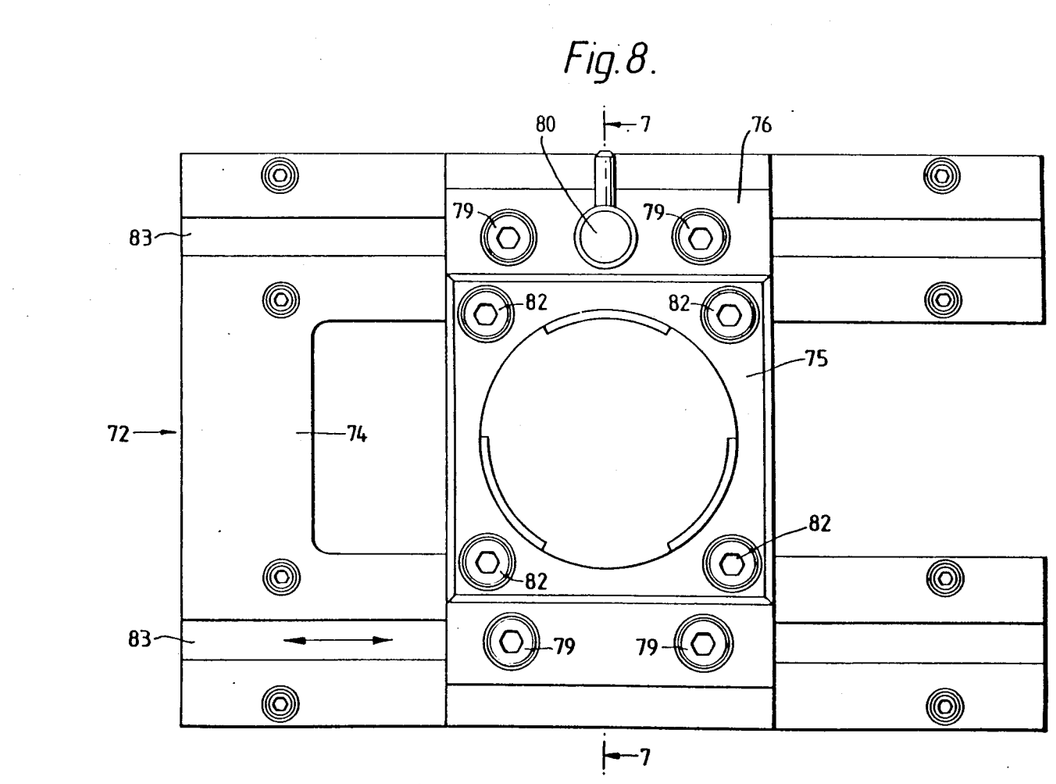

The magnetic clamp 72 (FIGS. 7 and 8) comprises a pair of bar electromagnets 73 joined together via a horseshoe yoke 74. A bayonet socket 75 which clamps to the bayonet connector 39 is secured by bolts 82 to a top plate 76 of the clamp which is in turn fixed to legs 78 by bolts 79. The position of the plate 76 relatively to the yoke can be adjusted by sliding the legs along parallel tenon slots 83 in the yoke 72 to permit a one dimensional alignment of the welding head after excitation of the electromagnets 73. This position may be clamped by means of a locking screw 80.

The tool is attached to a source of compressed air such as a 150 cfm compressor from which the compressed air is taken directly or by using the stored energy of air at 8 bar from a 170 litre receiver.

The path along which air flows from the handle 5 to the motor 20 will now be described. Air passes through the opening 6 into a cavity 40 and from the cavity 40 along a first path into the bore 10 of the axially extending portion 8 of the piston 7. The air passes through the bore 9 into a cavity 41 defined between the piston 7 and the flywheel support 30. The air then flows into a second cavity 42 defined between the flywheel support 30 and a radially extending web 43 of the motor casing 16 via the openings 31 in the flywheel support and around the edge of the flywheel. The air then flows through openings (not shown) in the motor back plate 19 and a motor packing plate 44 into the motor cage 45. The air then exhausts through apertures 46 in the wall of the motor cage 45, past the return spring 33 and out of the casing portion 2 via exhaust outlets 47 in the wall of the casing portion.

The entire control of the tool is automatic to give a single trigger actuation for the weld cycle. The weld cycle is initiated by operating a safety trigger 48 which opens a valve (not shown) to allow air to pass through the handle 5 and via the previously described path to the motor 20. The motor 20 then accelerates to its initial working speed. Air also passes along a second path through a bleed hole 49 into a cavity 50. For small diameter studs it is acceptable for this air to act directly on the piston 7 to urge the motor casing 16 relatively to the casing portion 2 against the force of the spring 33. However, this simple operation does not maximise the machine potential. In practice, it is more satisfactory for the air from the bleed hole 49 to be subject to additional control. The control system is shown diagrammatically at 51 in FIG. 1 and in more detail in FIG. 4.

Figure 4:
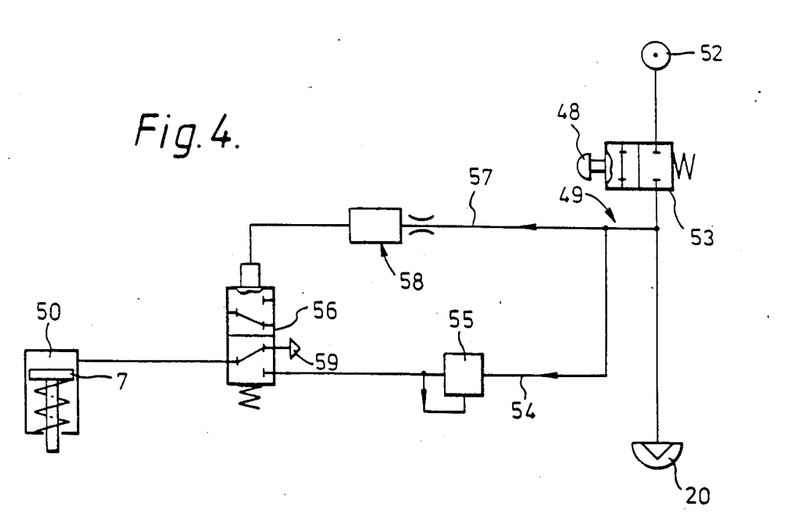
FIG. 4 is a diagram of the pneumatic control circuit.

FIG. 4 illustrates the source 52 of compressed air feeding to a start valve 53. This valve is controlled by the trigger 48. In operation, a proportion of the air supplied to the cavity 40 passes from the valve 53 through the bleed hole 49, as previously described, at which point it branches. As illustrated also in FIG. 4 the pressure applied through the bleed hole 49 is also applied directly to the motor 20 through the bore 10 etc. as previously described. One branch 54 guides air via a pressure regulator 55 to the input port of a 3-port, 2-way pilot operated spring return valve 56. The other branch communicates compressed air along a line 57 via a timer 58 to the pilot of the 3-port valve 56. Initially, the pilot air pressure is insufficient to overcome the return spring force so that the cavity 50, illustrated diagrammatically in FIG. 4, is exposed to atmospheric pressure via an exhaust outlet defined in a bolt 59 mounted in the upper casing part 1 and supporting the valve 56. After a delay of about 2 seconds determined by the timer 58, which is sufficient to enable the motor 20 to reach full speed, pilot pressure overcomes the return spring pressure thus allowing air supplied along the line 54 to communicate with the cavity 50. The incorporation of the pressure regulator 55 isolates piston forces from the effects of fluctuations in the supply pressure and permits the piston force to be adjusted with different stud sizes and conditions.

The friction welding process relies on heat generation between rubbing surfaces to provide a material flux which may be forged to produce an integral bond between the surfaces. In a typical friction welding cycle, a stud is rotated at relatively high speed while urged against a workpiece under comparatively light force for a period of time to enable sufficient heat to build up the form of flux whereupon rotation of the stud is stopped and the stud is urged against the workpiece under a much larger, forging pressure. In this example a single ram pressure is employed throughout the operation.

Figure 2:
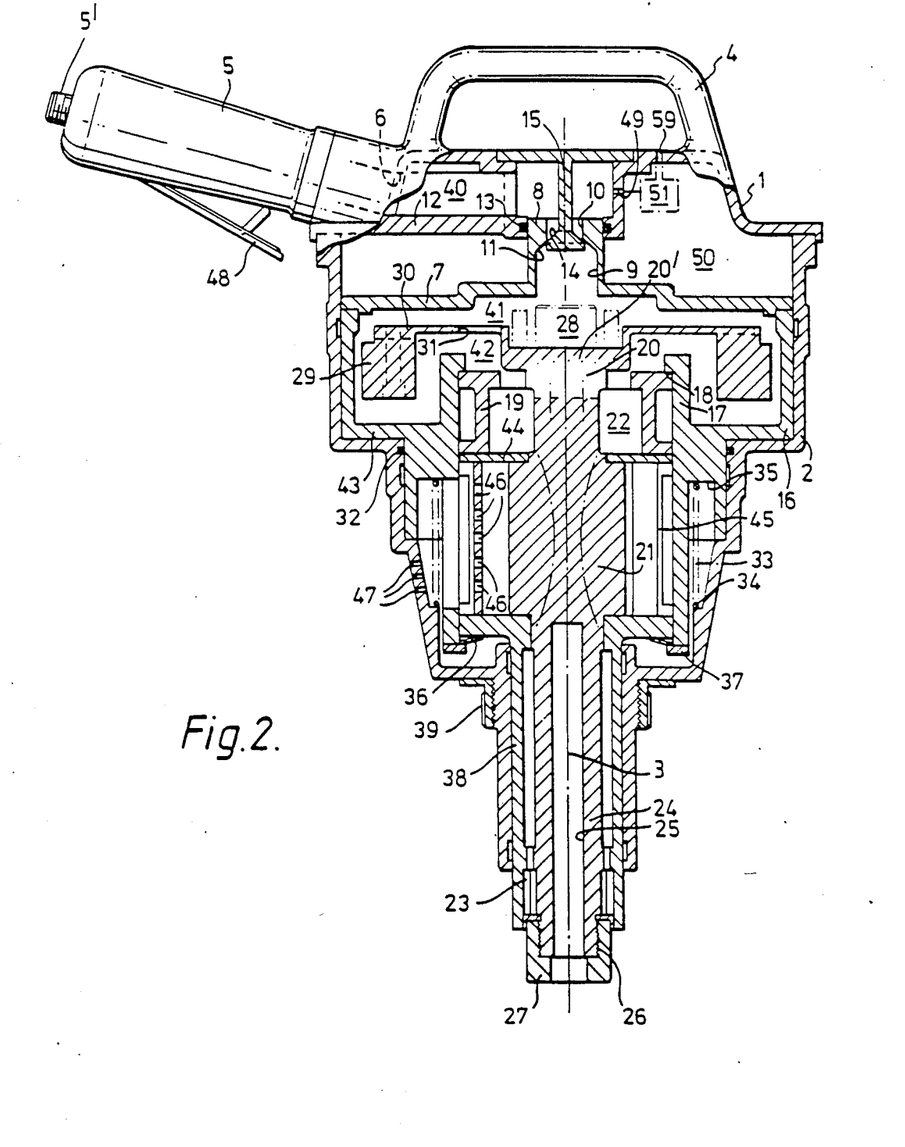
FIG. 2 is a view similar to FIG. 1 but illustrating the tool in its extended position.
Figure 5:
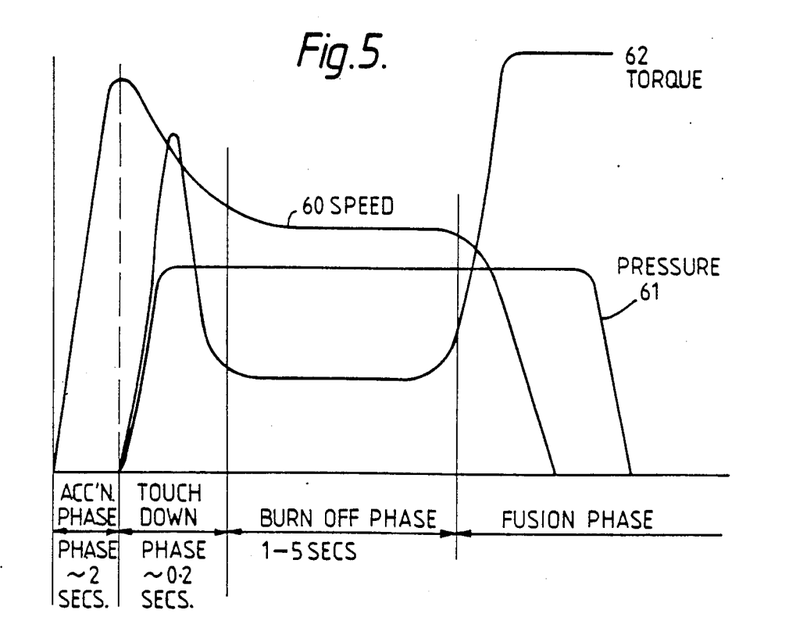
FIG. 5 illustrates graphically the relationship between torque, pressure, and speed experienced during a stud friction welding cycle.

Lines 60, 61, and 62 on FIG. 5 illustrate typical variations in rotational speed, applied pressure and resistive torque during the weld cycle. With reference to FIG. 4 the valve 48 is opened and air is supplied to the motor which then rapidly accelerates to maximum speed storing energy in the flywheel. After a time delay of typically 2 seconds the valve 56 switches an air supply from the line 54, via the regulator 55 to the ram 50 providing a ram force which is essentially constant throughout the weld cycle. Thus initial contact (touchdown) between the workpiece and the stud occurs only after the motor has accelerated to working speed. During touchdown high resistive torques are encountered which may exceed the driving torque of the motor. At this time the rotational speed of the motor and flywheel decreases and energy is drawn from the flywheel to contribute to the establishment of a region of a softened material (flux) between the fraying surfaces. As the flux is established the resistive torque falls to equal the driving capacity of the motor after which time the rotational speed remains substantially constant and the motor alone supplies energy for the continuation of the burn off phase. During the axial movement of the piston the valve seat 11 slowly approaches the valve member 14 until eventually the valve closes preventing any further air communicating with the motor 20 (FIG. 2). At this point the motor ceases to rotate and weld fusion occurs. The valve 48 is now closed, interrupting the air supply to the cylinder and completing the weld cycle.

It will thus be seen that the tool automatically controls the way in which the rotational speed and pressure applied to the stud vary during the weld cycle without any operator intervention.

One of the critical factors in this control is the duration of the burn-off phase. This can be varied by changing the initial relative position between the valve seat 11 and the valve member 14 by, for example, changing the length of the finger 15.

A further problem when stud welding is that there is a wide variation in frictional torque through the weld cycle as is shown in FIG. 5 by a line 62. On initial contact of the rubbing surfaces there is a relatively high frictional torque which persists until a flux of hot metal has been established. In a satisfactory weld cycle this high torque lasts for a short period of time, say 0.2 seconds. When the flux is established the resistive torque falls to a level during the burn-off phase which may typically be 25% of the initial peak torque. During this phase axial pressure is maintained on the stud and stud material is "burnt off" adding to the flux. The burn off phase continues until the driving torque is removed. At this time, as previously explained, the flux cools, the weld fuses and resistive torque increases.

In order that the tool is portable it is made of lightweight materials and the rotating components of the motor 20 and the stud holding assembly thus have an inherently low inertia. This is not helpful when attempting to deal with the problems of high initial torque described above.

To deal with this problem, the flywheel 29 is provided. Energy is stored in the flywheel 29 during the initial acceleration of the motor 20. On engagement of the stud with the workpiece, the load on the motor 20 will suddenly increase due to dry friction between the stud and the workpiece. However, due to the energy previously stored by the flywheel 29, this extra load will be overcome so that the stud will continue to rotate but at a lower speed. Typically a speed loss of about 20% of the maximum speed will occur (see line 60 in FIG. 5). It is important to note that the inertia is not, as in the case of conventional inertia welding, used to supply all the welding energy but is used to boost the air motor 20 during the initial (touchdown) phase of welding. In this manner, the capacity of the tool is substantially increased compared with a unit relying wholly on the motor power of the energy input at the time of welding. The quantity of inertia employed may be varied depending upon the type of stud to be welded.

Figure 6:
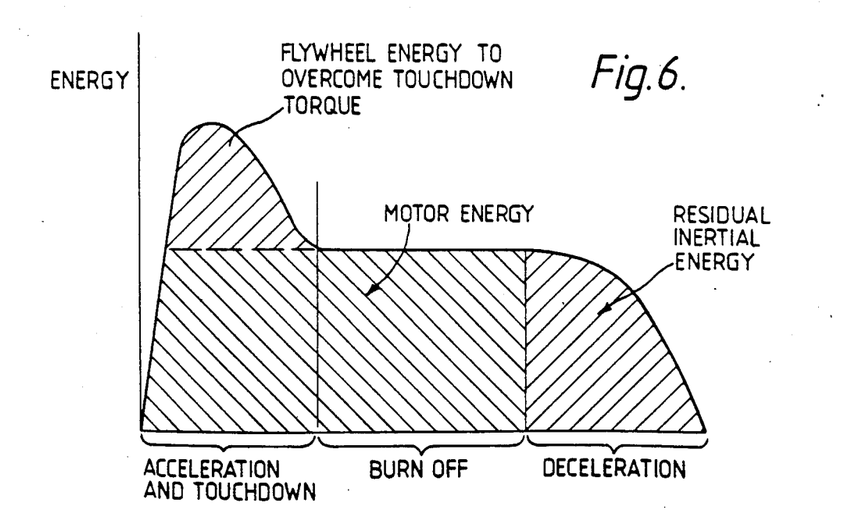
FIG. 6 illustrates graphically the energy supply to the drive shaft of the drive motor of the tool shown in FIGS. 1 and 2 during the weld cycle.

FIG. 6 illustrates the energy supplied to the stud to rotate the stud during a weld cycle. Contact (touchdown) between the stud and the workpiece takes place about 2 seconds after acceleration is initiated as shown in FIG. 6 and it will be seen that very shortly thereafter there is a requirement for the extra inertial energy stored by the flywheel 29. However, this requirement ceases after the resistive torque has been overcome and there is then a fairly constant energy requirement indicated by a section 63 of the graph. Finally, when the air supplied to the motor 20 is being cut off the driving energy will gradually be decreased to zero as the residual inertial energy is dissipated.

In some cases, it may be desirable to include transducers for monitoring motor speed, piston pressure, and stud displacement. In this case, the output from the transducers may be stored via a microcomputer at the time of welding and may be then compared with standard results to enable a non-destructive assessment of weld quality to be obtained.

It will be noted that if the clamping arrangement should fail during welding, the air pressure will immediately force the piston 7 to the FIG. 2 position thus stopping the motor 20. This is an important safety feature.

We claim:

1. Friction welding apparatus comprising a housing (1,2); a workpiece support (20',24) rotatably and axially movably mounted in the housing (1,2); a fluid pressure operated drive (20) coupled to the workpiece support for causing the workpiece support to rotate relatively to the housing; resilient means (33) for urging the workpiece support in a first axial direction relatively to the housing (1,2); pressure means (7) responsive to fluid pressure to move the workpiece support relatively to the housing in a second axial direction opposite to the first direction; a fluid inlet (6) in the housing; fluid conveying means (40,41,42,50) for communicating fluid under pressure from the inlet (6) along a first path to the drive (20) and along a second path to the pressure means (7); and control means (8,9,11,14) responsive to axial movement of the workpiece support in the housing for controlling the fluid pressure communicated along the first path whereby as the workpiece support moves in the housing under the influence of the pressure means (7), the first path is gradually closed while the second path remains open.

2. Apparatus according to claim 1, wherein the control means comprises a valve body with an input port (10) communicating with the fluid inlet (6), output ports communicating with the first and second fluid paths respectively, and a valve member (8) movable in the valve body in response to relative axial movement between the workpiece support and the housing to control fluid communication between the input port and the output port connected to the first path while maintaining the connection between the input port and the other output port.

3. Apparatus according to claim 2, wherein the valve body comprises a valve seat (11) cooperating with the valve member (14), one of the valve member and valve seat being connected to the housing (1,2) and the other being connected to the workpiece support (20').

4. Apparatus according to claim 1, wherein the pressure means includes a piston associated with the workpiece support and axially movably mounted in the housing (1, 2) so as to define with the housing a piston/cylinder assembly.

5. Apparatus according to claim 4, wherein the valve body comprises a valve seat (11) cooperating with the valve member (14), one of the valve member and valve seat being connected to the housing (1,2) and the other being connected to the workpiece support (20'), and wherein the valve body is defined by an axially extending spigot connected to the piston (7).

6. Apparatus according to claim 1, further comprising timing means positioned in the second fluid path so as to provide an initial time delay before fluid pressure is applied to the pressure means.

7. Apparatus according to claim 1, wherein the drive comprises an air driven motor.

8. Apparatus according to claim 1 wherein the apparatus is portable.

* * * * *